United States Patent [19]
Lee et al.

[11] Patent Number: 5,402,284
[45] Date of Patent: Mar. 28, 1995

[54] TRAY HOUSING DRIVING APPARATUS OF DIGITAL AUDIO TAPE RECORDER

[75] Inventors: Chang W. Lee; Young S. Seo, both of Suweon; Moon W. Lee, Seoul, all of Rep. of Korea

[73] Assignee: SamSung Electronics Co., Ltd., Suwon, Rep. of Korea

[21] Appl. No.: 145,852

[22] Filed: Nov. 5, 1993

Related U.S. Application Data

[63] Continuation-in-part of Ser. No. 732,132, Jul. 18, 1991, abandoned.

[51] Int. Cl.6 .............................................. G11B 5/008
[52] U.S. Cl. .................................................. 360/96.5
[58] Field of Search ...................... 360/96.5, 96.6, 85; 242/197–201

[56] References Cited

U.S. PATENT DOCUMENTS

5,249,089  9/1993  Maeng ................................ 360/96.5

Primary Examiner—A. J. Heinz
Attorney, Agent, or Firm—Robert E. Bushnell

[57] ABSTRACT

A tray housing driving apparatus employs a cam gear and a sector gear to load, transport and seat a tape cassette using only one motor, and switches are installed on a chassis to control an interlinked operation of a lower drawer and a skater, thereby simplifying the complex structure of the conventional digital audio tape recorder in which the tray housing driving apparatus performs the cassette inserting and seating operations using two motors and three switches, reducing the number of components and assembling operations, reducing cost, and reducing the size of the product.

32 Claims, 9 Drawing Sheets

TRAY HOUSING DRIVING APPARATUS OF DIGITAL AUDIO TAPE RECORDER

REFERENCE TO RELATED APPLICATION

This application is a continuation-in-part application of pending application Ser. No. 07/732,132, filed on Jul. 18, 1991, abandoned, and assigned to the same assignee.

BACKGROUND OF THE INVENTION

The present invention relates to a tray housing driving apparatus, and more particularly to a tray housing driving apparatus of a digital audio tape (DAT) recorder for loading and seating a tape cassette using a single motor.

Conventional DAT recorders are complicated in structure and not compact in size since two motors and three switches are used to transfer and seat a tape cassette, thereby increasing manufacturing processing operations and labor costs as well as wasting materials.

SUMMARY OF THE INVENTION

The object of the present invention is to provide a tray housing driving apparatus of a DAT recorder, wherein a tape cassette is transferred and seated by means of a cam gear and an sector gear in a DAT recorder to complete its operation by driving a motor and to perform an interlinked operation by using two switches, so that the number of components and man-hours for assembling can be reduced, which reduces the manufacturing cost, simplifies the construction of the DAT recorder and reduces its size.

To achieve the above object of the present invention, there is provided a tray housing driving apparatus for use in a digital audio tape recorder to reproduce an audio signal recorded on tape. The tray housing driving apparatus includes a housing driving unit and a tape cassette seating unit. The housing driving unit includes a cam gear to operate a skater and a sector gear for operating a lower drawer, with both the cam gear and the sector gear being driven by a motor. The tape cassette seating unit places the tape cassette on the reel table containing the play and take up reels by allowing a tape cassette holder to be moved up and down according to the operation of the skater. The single motor drives both the housing driving unit and the tape cassette seating unit, and an interlock prevents operation of the housing driving unit when the tape cassette is seated.

BRIEF DESCRIPTION OF THE DRAWINGS

The above object and other features and advantages of the present invention will become more apparent from the following description of a preferred embodiment thereof and reference to the attached drawings in which.

DETAILED DESCRIPTION OF THE PREFERRED EMBODIMENT

Figure 1:
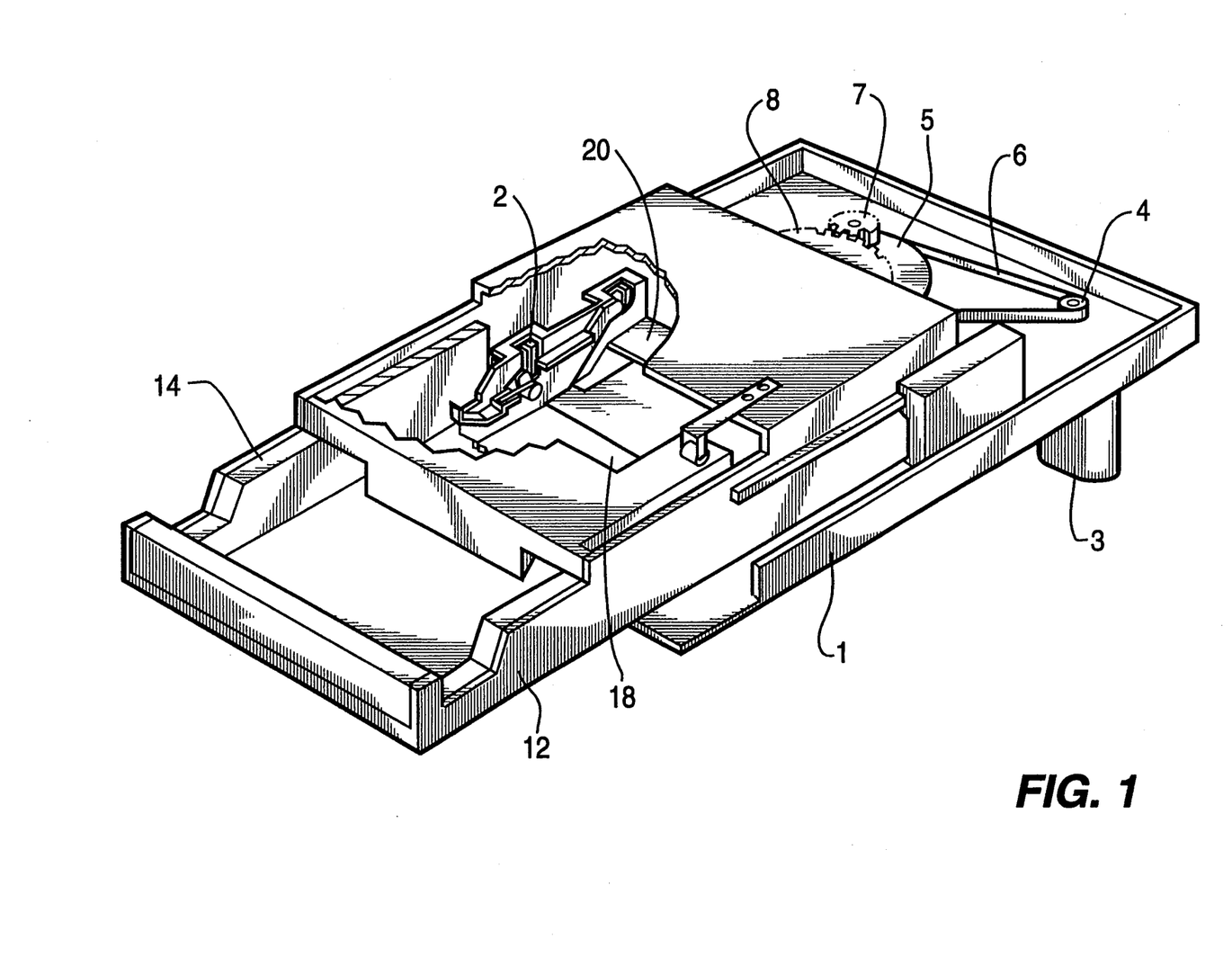
FIG. 1 is a perspective view showing a tray housing driving apparatus according to the present invention.

Referring to FIG. 1 of the drawings which shows a tray housing driving apparatus for a DAT recorder according to the present invention, a motor 3 is installed on one side of a chassis 1, and a driving pulley 4 connected to the shaft of motor 3 and a gear pulley 5 are coupled by a belt 6. A lower drawer 12 is extended and retracted relative to the chassis 1 by a cam gear 8 rotated by a driving gear 7 coupled to the rotational shaft of gear pulley 5 to transfer a tape cassette (not shown in FIG. 1) out of and into the DAT recorder. A cassette holder 18 accommodates the tape cassette fed by the lower drawer 12. A guide bracket 2 and a skater 20 are adjacently fitted with each other and operate to vertically elevate and lower the cassette holder 18.

Figures 2A, 2C:
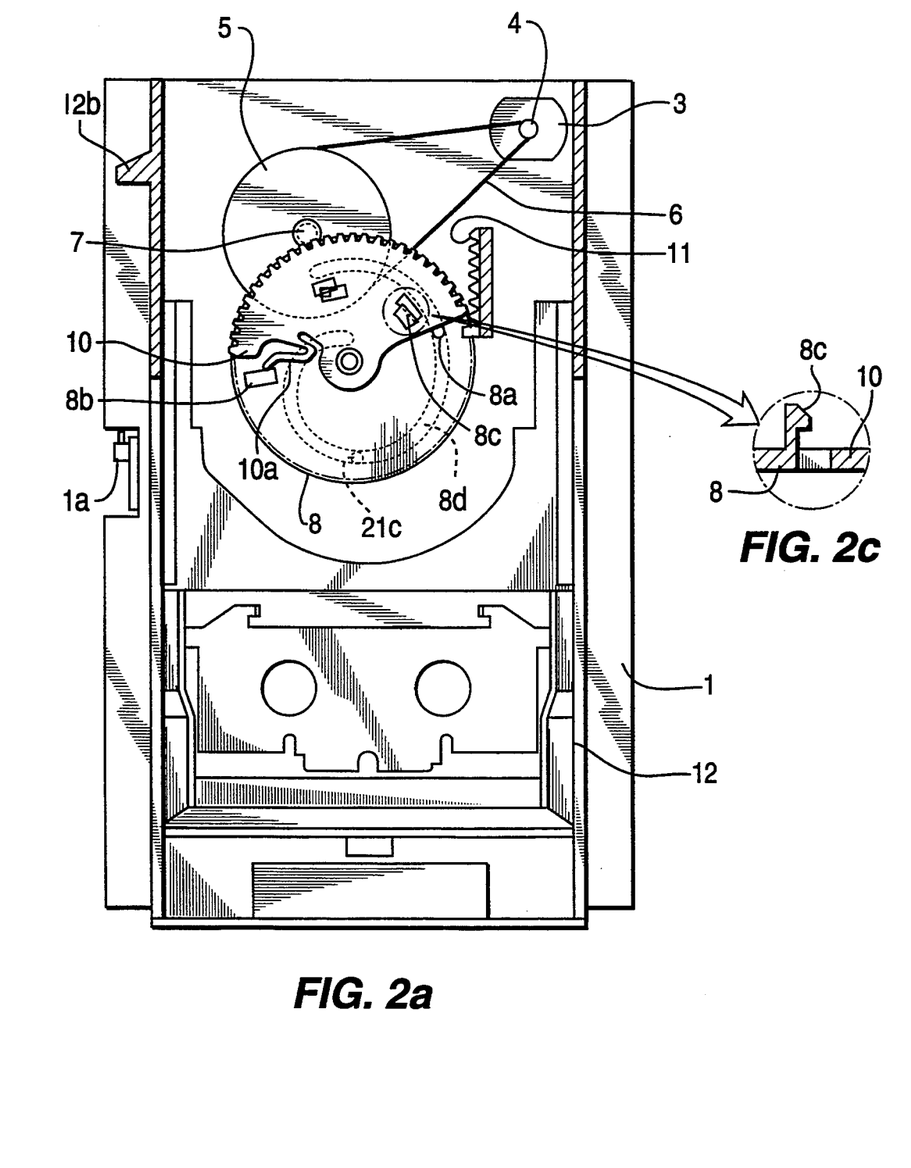
FIGS. 2(a)-2(c) are a plan view, a perspective view and a sectional view, respectively, showing portions of the apparatus of FIG. 1.
Figure 2B:
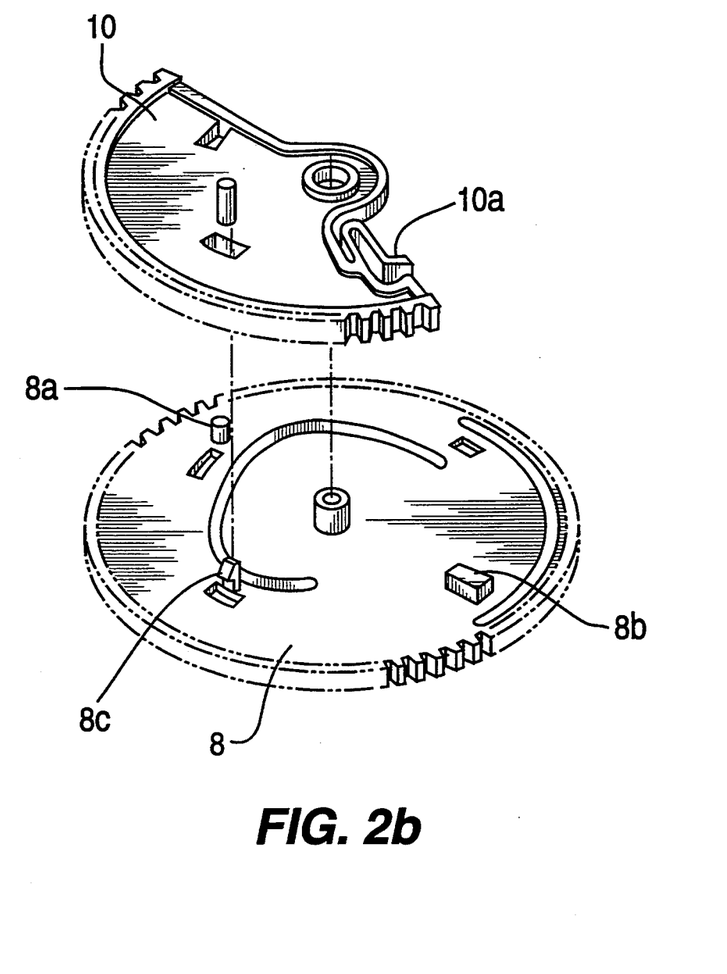
Figure 3A:
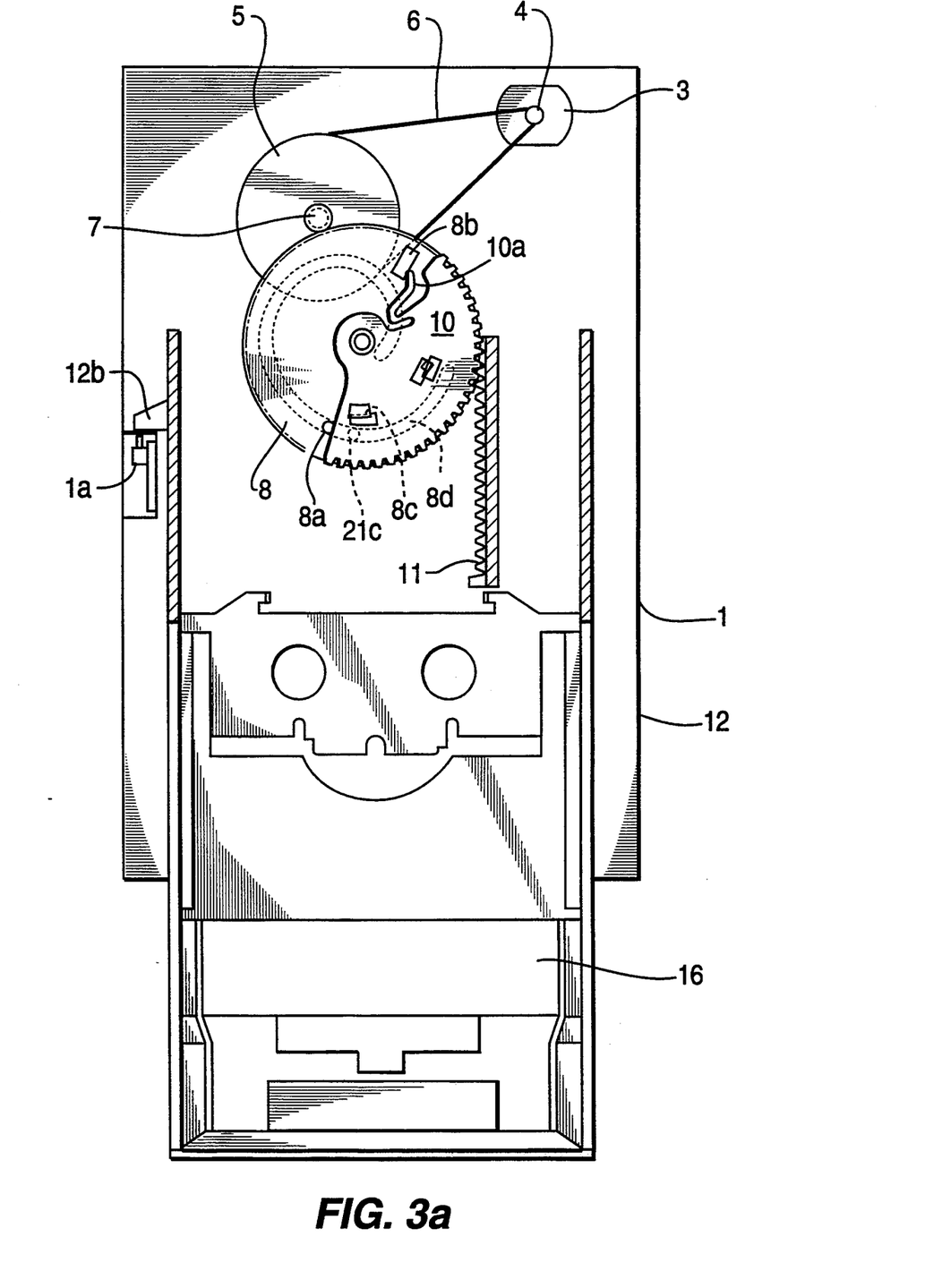
FIG. 3(a) is a plan view, partially in section and with some structure omitted for greater clarity, showing an operational state of the apparatus of FIG. 2(a)
Figure 3B:
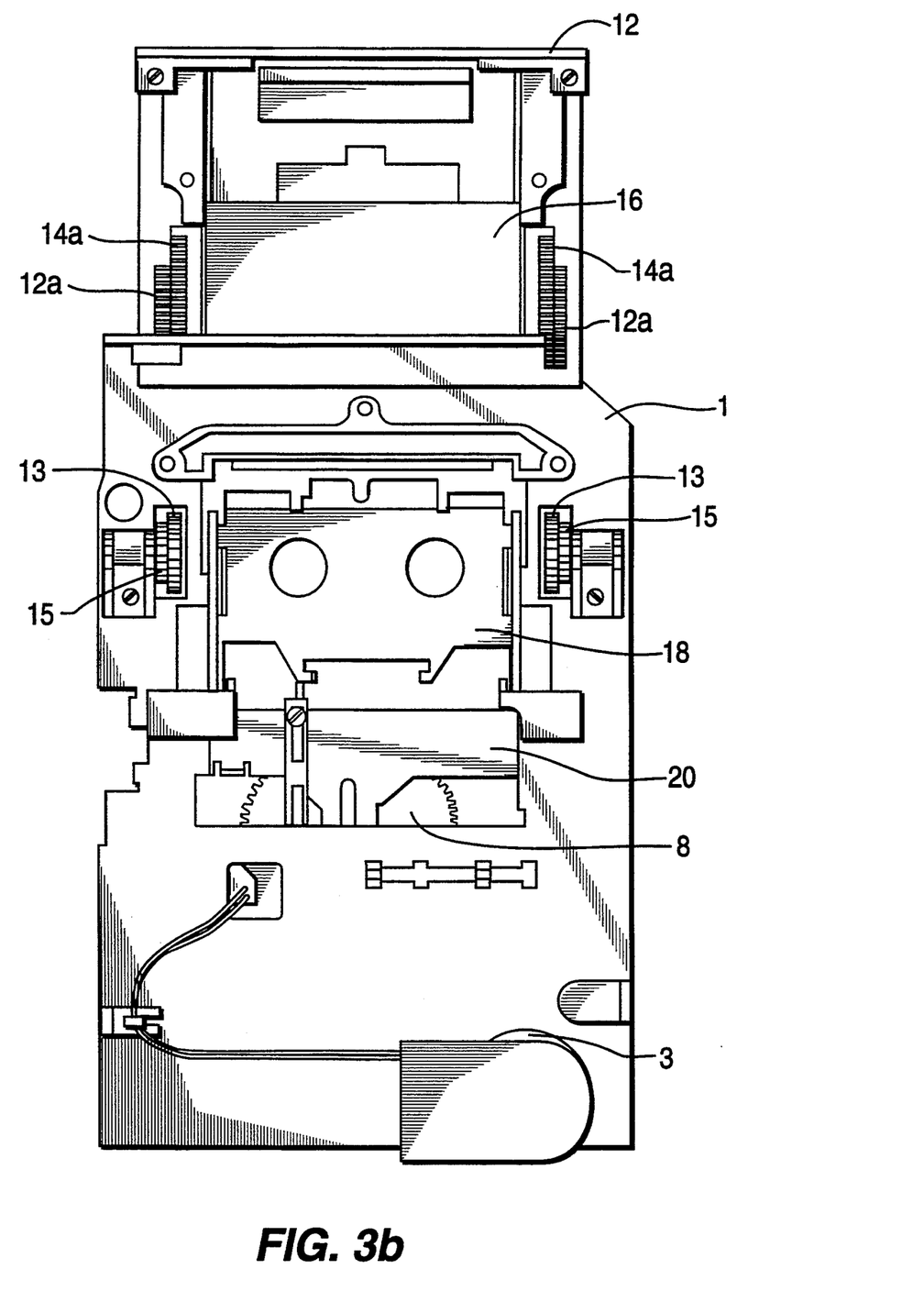
FIG. 3(b) is a bottom view of the apparatus of FIG. 3(a)

FIGS. 2(a), 3(a) and 3(b) schematically illustrate different stages during driving of the tray housing apparatus of a DAT recorder. The driving gear 7 of the gear pulley 5 is engaged with the cam gear 8. As shown in FIG. 2(b), a semi-circular sector gear 10 having an elastic or resilient piece 10a on one side thereof is coupled to the upper surface of the cam gear 8 by means of a hook 8c. Note also FIG. 2(c).

The elastic piece 10a of the sector gear 10 is engaged by a projection 8b extending from the surface of the cam gear 8. On the side of the sector gear opposite from the elastic piece 10a, the cam gear 8 and the sector gear 10 are limited by a fixing pin 8a such that the cam gear and the sector gear are rotatable in the same direction. A switch 1a is provided at the midpoint of one side of chassis 1, and an operational piece 12b protrudes from one side of the lower drawer 12 to contact and operate the switch 1a when the lower drawer 12 is moved. Reference numeral 21c designates a transfer pin, the purpose of which will be described below.

A slider 16 is installed on the lower drawer 12 to slide resiliently by a spring, and acts to prevent separation of the tape from the tape cassette 22 when the cassette is open during operation of the tray housing driving apparatus.

Figure 4:
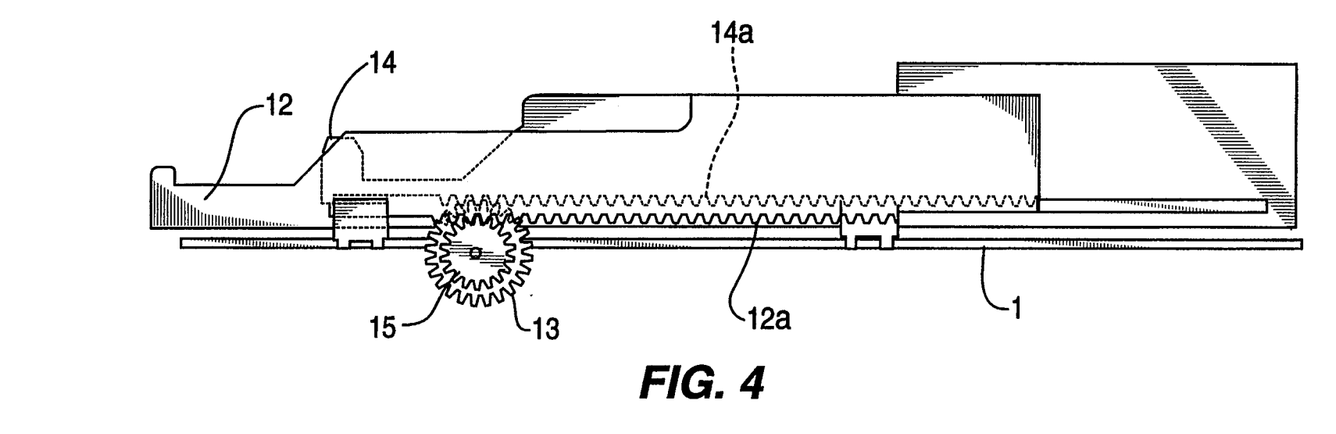
FIG. 4 is a side view showing the state of the tray housing driving apparatus before being operated.
Figure 5:
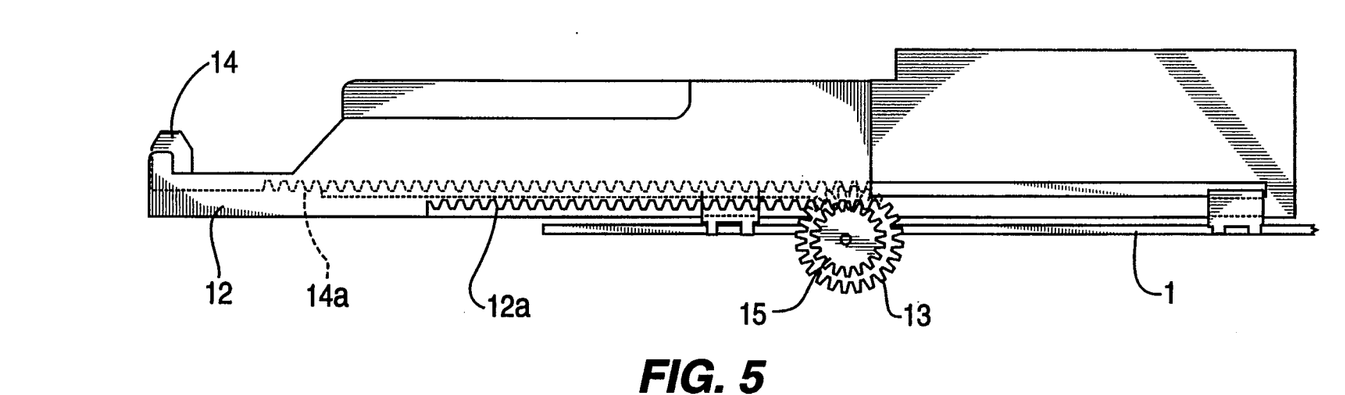
FIG. 5 is a side view showing the state of the tray housing driving apparatus after being operated.

FIGS. 3(b), 4 and 5 schematically illustrate the speed-increasing or speed regulating device of the tray housing driving apparatus for a DAT recorder according to the present invention. The lower drawer 12 is slidably installed on the chassis 1, and an upper drawer 14 is placed inside the lower drawer 12. In order to prevent vertical separation of the upper drawer 14 from the lower drawer 12 during operation, hooking projections (not shown) are provided on both sides of the lower portion of the lower drawer 12 which engage corresponding hooking grooves (not shown) formed on both sides of the lower portion of the upper drawer 14.

A first rack gear 12a is provided on the lower surface of the lower drawer 12, and a second rack gear 14a is provided on the lower portion of the upper drawer 14, with the second rack gear 14a being of greater length than the first rack gear 12a. A pair of pinion gears, a small pinion 15 and a large pinion 13, is installed coaxially on each side of the chassis 1 to be engaged by the first and second rack gears 12a and 14a, respectively. Note FIG. 3(b). When the lower drawer 12 is moved by the sector gear 10, the small pinion 15 meshed with the first rack gear 12a of the lower drawer 12 rotates, and the coaxial large pinion 13 also rotates, thereby moving the upper drawer 14. The upper drawer 14 advances faster than the lower drawer 12 because of the size difference in the pinions 15 and 13 and, similarly, retreats faster than the lower drawer 12. Thus, the moving speed between the upper drawer 14 and the lower drawer 12 are different and can be changed.

Figure 6A:
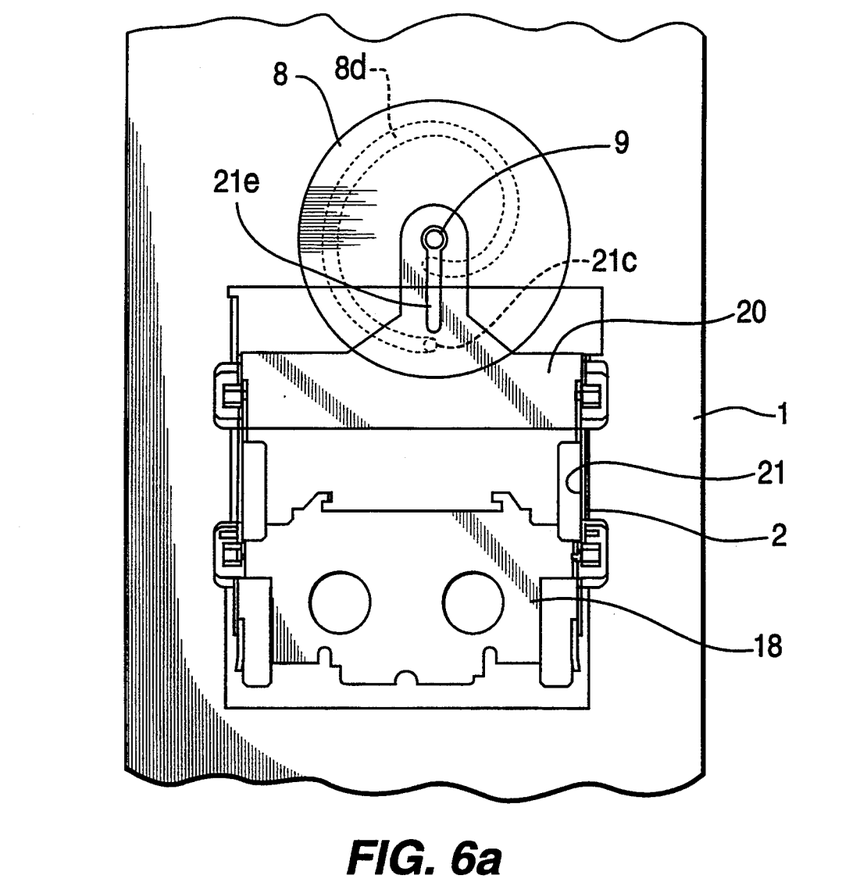
FIGS. 6(a), 6(b), 7(a), 7(b), 8(a) and 8(b) are views showing operational stages in the seating of a completely-loaded tape cassette.
Figure 6B:
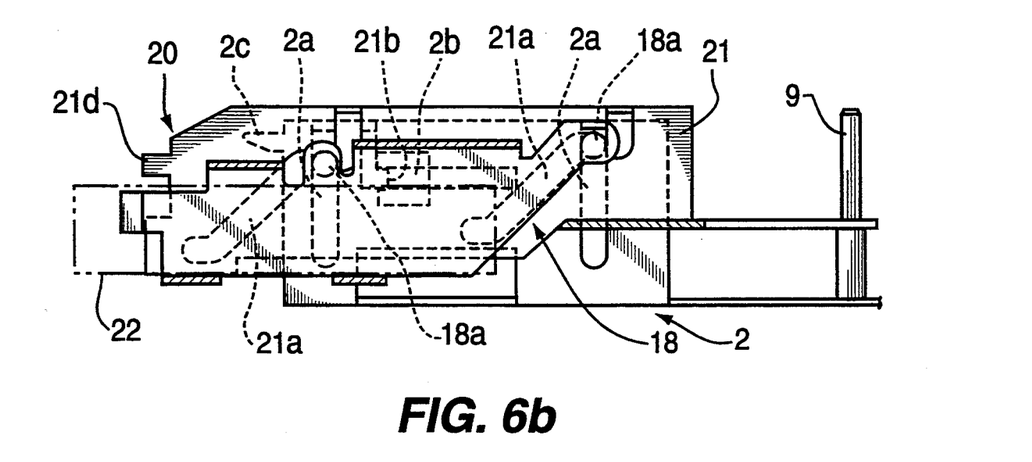
Figure 7A:
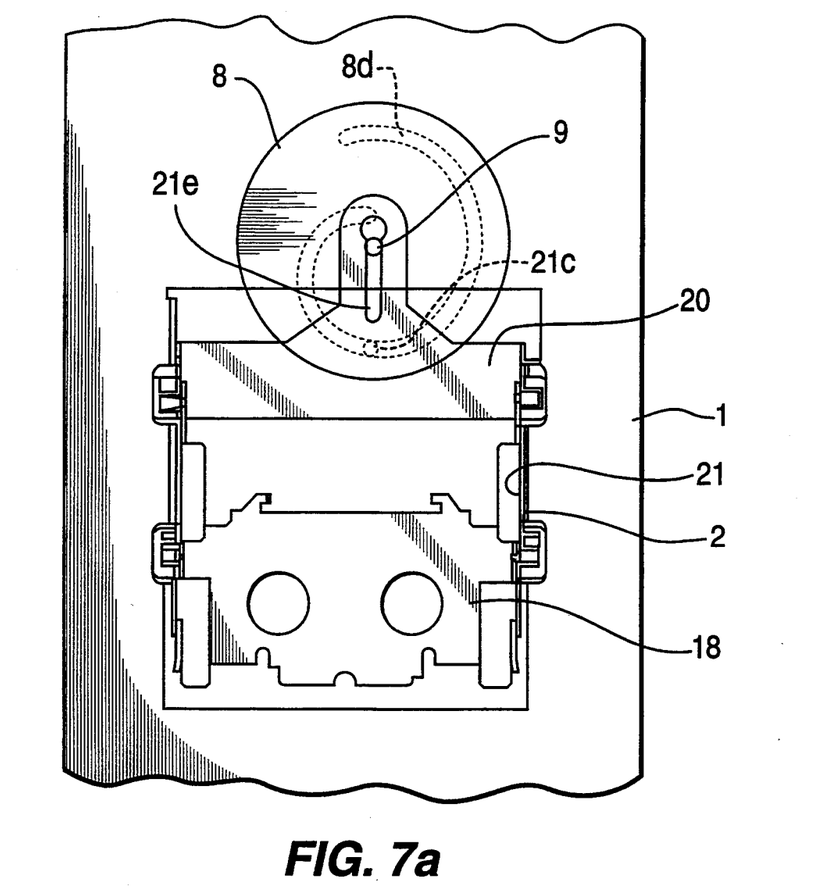
Figure 7B:
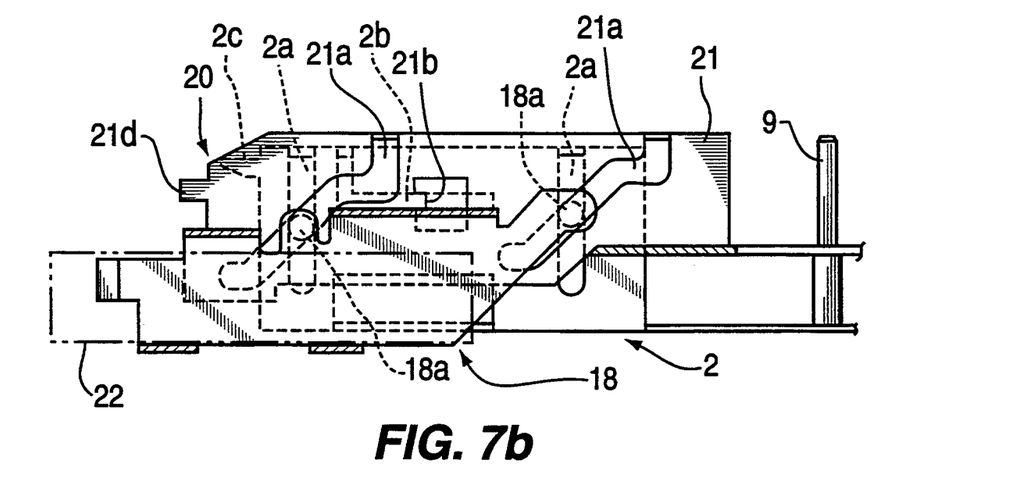
Figure 8A:
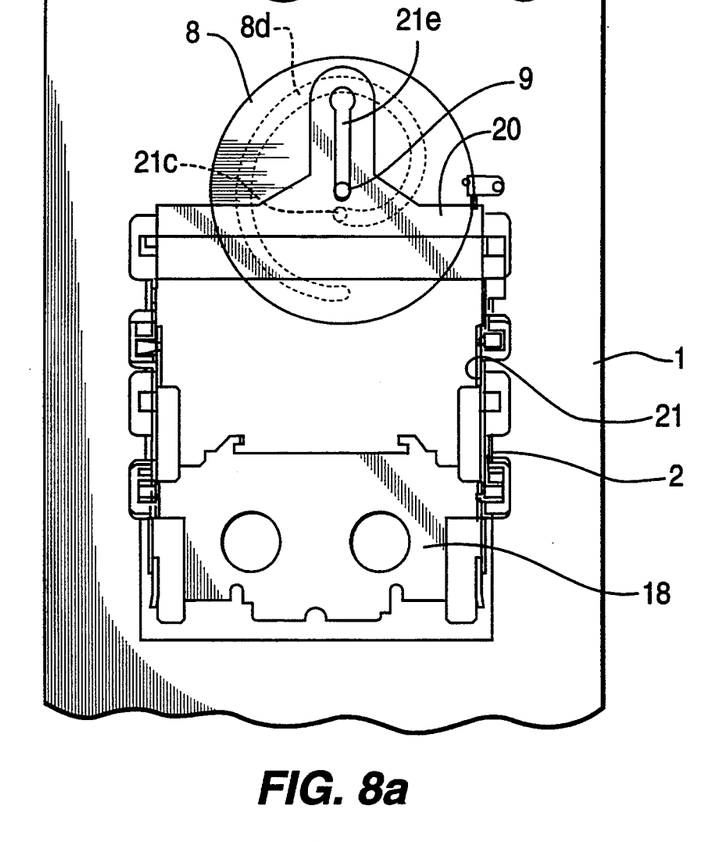
Figure 8B:
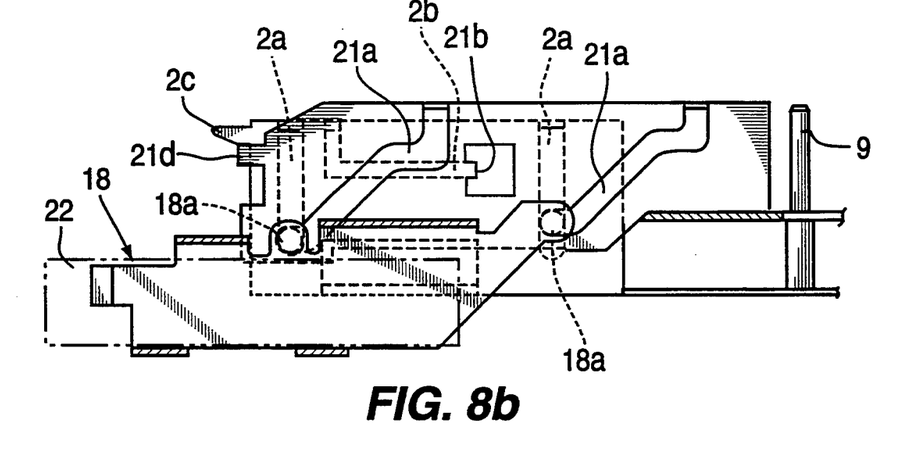

FIGS. 6 to 8 illustrate the procedure for seating the tape cassette in the DAT recorder according to the present invention. In FIGS. 6(a), 7(a) and 8(a), the upper plate of the lower drawer has been removed to enhance clarity.

The guide bracket 2 is provided on the inner side of the chassis 1, the skater 20 having a slide bracket 21 is provided on the inner side of the guide bracket 2, and the cassette holder 18 is mounted inside the skater 20. Each guide bracket 2 (one on each side of the chassis 1) has two vertically-elongated slots 2a spaced by a predetermined distance, with a horizontally-elongated slot 2b extending between them, and a jut or tip 2c on one end of the guide bracket. Note FIGS. 6(b), 7(b) and 8(b).

The skater 20 has the bent slide brackets 21 on both sides thereof such that each of the slide brackets 21 has two obliquely-elongated slots 21a spaced by a predetermined interval, a protrusion 21b received in and movable along the horizontally-elongated slots 2b of the guide bracket 2, and a projecting piece 21d on one end which is vertically blocked by the jut 2c for preventing the cassette holder 18 from being upwardly actuated when the cassette holder 18 is loaded with the tape cassette 22. The ends of a squared horseshoe-shaped shaft 18a fixed to the cassette holder 18 are slidably received in the obliquely-elongated slot 21a of the slide bracket 21 and the vertically-elongated slot 2a of the guide bracket 2.

A transfer pin 21c projecting from a center portion of the skater 20 is received in a cam groove 8d formed in the lower surface of the cam gear 8 to allow the skater 20 to move forward and backward, and the protrusion 21b provided on one side of the skater 20 operates a switch 1b on the chassis 1 when the skater 20 is completely withdrawn. Skater 20 also has a slot 21e to receive the shaft 9 of the cam gear 8 to guide the back and forth movement of the skater.

The tray housing driving apparatus constructed as above is operated in such a manner that, when the motor 3 is activated, such as by operation of a control switch (not shown), the belt 6 is driven to rotate the cam gear 8 to drive a rack 11 provided on the inside of the lower drawer 12 to move the lower drawer. As the lower drawer 12 moves, the small and large pinions 15 and 13 are rotated by the first rack gear 12a fixed to the lower portion of the lower drawer 12, causing the upper drawer 14 to advance at a higher speed to open the tray housing to receive the tape cassette 22. Contact between the projection 8b on the cam gear 8 and the elastic piece 10a of the sector gear 10 offsets backward torque induced by the engagement of the sector gear with the rack 11, and absorbs any mechanical shock. Note FIGS. 2(a) and 3(a).

During extension of the lower drawer 12, contact between the operational piece 12b projecting from the side of the lower drawer 12 and the switch 1a stops the motor 3 and the motor is switched from forward rotation mode to the backward rotation mode. After the tape cassette 22 has been inserted or removed, as the case may be, operating the motor 3 in the backward rotation mode, which may be initiated by any suitable means such as by activating another control switch (not shown) or pushing slightly on the tray housing door to break contact between the switch 1a and the operational piece 12b, reverses the above operation to close the tray housing.

As the tray housing closing operation is completed, the cam gear 8 continues to rotate as the sector gear 10 separates from the rack 11. During the backward rotation of the cam gear 8 as described above, the transfer pin 21c of the skater 20 has been moved inwardly, from the position shown in FIG. 6(a) to that of FIG. 8(a). Due to the engagement of the transfer pin 21c with the cam groove 8d formed in the lower surface of the cam gear 8, rotation of the cam gear causes the transfer pin and the skater 20, under guidance of the coaction of the cam shaft 9 with an elongated guide slot 20a formed in the skater, to move inward linearly. At the same time, the movable shaft 18a of the cassette holder 18 accommodating the tape cassette 22 descends along the vertically-elongated slot 2a of the guide bracket 2 by means of the obliquely-elongated slot 21a as the skater 20 moves inwardly, so that the tape cassette 22 can be seated. Different stages during this movement are shown in FIGS. 6(b), 7(b) and 8(b). In FIG. 6(b), the tape cassette 22 is completely loaded within the DAT recorder, and seating of the tape cassette on the reel table has not begun. In FIG. 8(b), the tape cassette is fully seated on the reel table. Once the tape cassette is seated, the tape in the cassette is placed on the record and play magnetic heads in a known manner.

During this movement, since the projecting piece 21d formed on the slide bracket 21 of the skater 20 is stopped by engagement with the lower surface of the jut 2c formed on one end of the guide bracket 2, slide bracket 21 can not move upwardly further, so that the tape cassette 22 inserted into the cassette holder 18, once loaded, can not move upwardly. Note FIG. 8(b). In addition, when the skater 20 withdraws completely, the protrusion 21b on one side thereof operates the switch 1b of the chassis 1, thereby performing the succeeding operation.

Accordingly, the tray housing driving apparatus of the DAT recorder according to the present invention employs the cam gear and sector gear to perform the inserting, loading and seating operations of the tape cassette using only one motor. Moreover, the chassis has respective switches to allow an interlinked operation of the lower drawer and skater to simplify the complex structure of the tray housing driving apparatus of the conventional DAT recorder wherein the cassette transferring and seating operations are performed with two motors and three switches. As a result, by employing the cam gear and sector gear as described above, the tray housing driving apparatus of the present invention reduces the number of components and man-hours for assembling, reduces cost, and provides a more compact product.

While the present invention has been particularly shown and described with reference to a specific embodiment thereof, it will be understood by those skilled in the art that various changes in form and details may be effected herein without departing from the spirit and scope of the invention as defined by the appended claims.

What is claimed is:

1. A tray housing driving mechanism for use in a digital audio tape recorder for recording and reproducing audio signals on a cassette tape, comprising:

housing means for transporting the cassette tape in the recorder, including an upper drawer and a lower drawer, with said upper drawer is slidingly seated on said lower drawer;

housing driving means for driving said housing means, comprising a cam gear for sliding a skater having a skater slide bracket upon receipt of power from a motor, and a sector gear operatively coupled to said cam gear for sliding said lower drawer;

speed regulating means responsive to said lower drawer as said lower drawer slides, for moving rectilinearly said upper drawer faster than said lower drawer;

placement means slidingly coupled with said skater slide bracket for seating the cassette tape by moving a cassette holder up and down as said skater slides said skater slide bracket; and controlling switch means for terminating operation of said housing driving means.

2. A tray housing driving mechanism as claimed in claim 1, wherein said sector gear further comprises an elastic piece and transiently couples with said cam gear via a hook, said elastic piece of said sector gear engages a protuberance of said cam gear to absorb impacts between said hook and said sector gear.

3. A tray housing driving mechanism as claimed in claim 1, wherein a transfer pin of said skater is inserted into a cam slot of said cam gear, and a guide slot of said skater is engaged by a cam shaft of said cam gear so that rotation of said cam gear causes rectilinear movement of said skater.

4. A tray housing driving mechanism as claimed in claim 1, wherein two switches of said controlling switch means are installed on a chassis and in transient contact with operating elements of said skater and said lower drawer, respectively, a first one of said switches operable to stop movement of said skater upon completion of operation.

5. A tray housing driving mechanism as claimed in claim 1, wherein said cassette holder cooperates with said upper drawer to transfer said tape cassette therebetween.

6. A tray housing driving mechanism as claimed in claim 1, wherein said upper drawer is slidably seated on said lower drawer and said upper drawer is adjacent to and nestled within said lower drawer and extends and retracts with said lower drawer in response to being driven by said lower drawer via said speed regulating means.

7. A tray housing driving mechanism as claimed in claim 6, wherein said cassette holder cooperates with said upper drawer to transfer said tape cassette therebetween.

8. A tray housing driving mechanism for use in a digital audio tape recorder, comprising:

housing assembly for receiving and transporting a tape cassette in the recorder, comprising an upper drawer, a lower drawer and a tape cassette holder, said upper drawer being adjacent to and slidably nestled within said lower drawer;

housing driving means for operating said housing assembly, said housing driving means comprising a motor, a skater coupled to said tape cassette holder, a cam gear for transmitting power to said skater from said motor, and a sector gear coupled with said cam gear for transmitting power to said lower drawer to move said lower drawer;

speed control means responsive to movement of said lower drawer, for moving rectilinearly said upper drawer faster than said lower drawer;

means for placing the tape cassette on a reel table by moving said cassette holder up and down as said skater slides; and control switching means for terminating operations of said lower drawer and said skater.

9. A tray housing driving mechanism as claimed in claim 8, wherein said sector gear further comprises an elastic piece and transiently engages said cam gear through a rigid hook, and said elastic piece of said sector gear is contacted by a protuberance of said cam gear to absorb impacts between said hook and said sector gear.

10. A tray housing driving mechanism as claimed in claim 8, wherein said skater further comprises an engagement piece which rides in a cam slot of said cam gear and a hole foraged in said skater to engage a cam shaft to linearly guide said skater in response to rotation of said cam gear.

11. A tray housing driving mechanism as claimed in claim 8, wherein first switch and a second switch of said control switching means are installed on a chassis and are in contact with an operating element of said skater and an operating element of said lower drawer, respectively, and wherein said first switch stops movement of said skater upon completion of operation.

12. A tray housing driving mechanism as claimed in claim 8, wherein said cassette holder cooperates with said upper drawer to transfer said tape cassette therebetween.

13. A tray housing driving mechanism as claimed in claim 8, wherein said upper drawer is slidably seated on said lower drawer and extends and retracts with said lower drawer in response to being driven by said lower drawer via said speed control means.

14. A tray housing driving mechanism as claimed in claim 13, wherein said tape cassette holder cooperates with said upper drawer to transfer said tape cassette therebetween.

15. A tray housing driving mechanism for use in tape recording device, comprising:

a motor;
   a cam gear drivably coupled to said motor;
   a first drawer having a first drawer first rack portion and a first drawer second rack portion;
   gear means, drivably coupled to said motor, for drivingly engaging said first drawer first rack portion to extend and retract said first drawer;
   a second drawer having a second drawer rack portion, slidably nestled within said first drawer, for receiving and carrying a tape cassette into said tape recorder device; and
   speed converting means, engaging said first drawer second rack portion, for drivingly engaging said second drawer rack portion to extend and retract said second drawer parallel to and in tandem with said first drawer, in response to extension and retraction of said first drawer.

16. A tray housing driving mechanism as claimed in claim 15, wherein said first drawer is a lower drawer extending and retracting underneath said second drawer.

17. A tray housing driving mechanism as claimed in claim 15, wherein said gear means comprises a sector gear drivably coupled to said cam gear to rotate with said cam gear and engage said first drawer rack portion only during a portion of rotation.

18. A tray housing driving mechanism as claimed in claim 17, further comprising:
a skater having an engagement piece received in a cam curve of said cam gear and a guide portion coacting with a cam shaft so that rotation of said cam gear causes rectilinear translation of said skater; and
a holder for receiving said tape cassette carried into said tape recording device by said second drawer, said holder having a shaft simultaneously engaging and movable in both a vertical slot formed in a chassis of said tape recording device and a diagonal slot formed in said skater, said diagonal slot overlapping said vertical slot during rectilinear translation of said skater so that said holder descends along said vertical slot to lower said tape cassette during said rectilinear translation.

19. A tray housing driving mechanism as claimed in claim 18, wherein said sector gear departs from engagement with said first drawer rack portion when said cassette tape is received by said holder.

20. A tray housing driving mechanism as claimed in claim 18, further comprising a switch engaging said first drawer to terminate movement at an extreme limit of movement of said first drawer.

21. A tray housing driving mechanism as claimed in claim 15, wherein said speed convening means comprises a first pinion for engaging said first drawer second rack portion and a second pinion, rigidly and coaxially attached to said first pinion and having a diameter larger than a diameter of said first pinion, for engaging said second drawer rack portion.

22. A tray housing driving mechanism as claimed in claim 21, wherein said first drawer is a lower drawer extending and retracting underneath said second drawer.

23. A tray housing driving mechanism as claimed in claim 21, wherein said gear means comprises a sector gear elastically and coaxially coupled to said cam gear to rotate with said cam gear and engage said first drawer rack portion only during a portion of rotation.

24. A tray housing driving mechanism as claimed in claim 23, wherein said sector gear includes an elastic piece for engaging a protuberance projecting from said cam gear to provide the elastic coupling.

25. A tray housing driving mechanism as claimed in claim 15, further comprising a slider slidably engaged with said first drawer for supporting a said tape cassette when said first drawer is extended.

26. A tray housing driving mechanism as claimed in claim 15, further comprising a switch engaging said first drawer to terminate movement at an extreme limit of movement of said first drawer.

27. A tray housing driving mechanism as claimed in claim 15, further comprising
a skater having an engagement piece received in a cam curve of said cam gear and a linear guide portion so that rotation of said cam gear causes rectilinear translation of said skater; and
a holder for receiving said tape cassette carried into said tape recording device by said second drawer, said holder having a shaft simultaneously engaging with and movable in both a vertical slot formed in a chassis of said tape recording device and a diagonal slot formed in said skater, said diagonal slot overlapping said vertical slot during rectilinear translation of said skater so that said holder descends along said vertical slot to lower said tape cassette during said rectilinear translation.

28. A tray housing driving mechanism as claimed in claim 27, further comprising a switch engaging said skater to terminate movement at an extreme limit of movement of said skater.

29. A process for operating a tray housing driving mechanism in a tape recording device to load a tape cassette, comprising:
drawing a tape cassette into said tape recording device by driving a sector gear engaging a rack of a lower drawer to retract said lower drawer and simultaneously retracting an upper drawer slidably nested on said lower drawer at a faster speed by driving a double pinion engaging racks of both said lower drawer and said upper drawer;
positioning a holder to receive said tape cassette from said upper drawer; and
linearly translating a skater having a diagonal slot so that a movable shaft of said holder engaging said diagonal slot and a vertical slot of a chassis descends along said vertical slot to seat said cassette tape.

30. A process as claimed in claim 29, wherein said upper drawer is slidably seated on said lower drawer and said upper drawer is adjacent to and nested within said lower drawer.

31. A process as claimed in claim 29, wherein said skater is linearly translated by rotating a cam gear having a cam curve engaging an operating piece of said skater.

32. A process as claimed in claim 31, where said cam gear is coaxial with and drives said sector gear.

* * * * *